US008038118B1

(12) United States Patent
Ajakie

(10) Patent No.: US 8,038,118 B1
(45) Date of Patent: Oct. 18, 2011

(54) APPARATUS FOR FORMING CONDIMENT RECEIVING CAVITY IN GROUND MEAT

(75) Inventor: Michael Ajakie, Deerfield Beach, FL (US)

(73) Assignee: Burger Pocket Press Co., Deerfield Beach, FL (US)

( * ) Notice: Subject to any disclaimer, the term of this patent is extended or adjusted under 35 U.S.C. 154(b) by 0 days.

(21) Appl. No.: 12/636,121

(22) Filed: Dec. 11, 2009

(51) Int. Cl.
  *B28B 7/00* (2006.01)
  *B28B 3/00* (2006.01)
(52) U.S. Cl. ........ 249/156; 249/158; 425/112; 425/318; 425/356; 426/513
(58) Field of Classification Search ............ 425/112, 425/318, 356; 249/155, 156, 158; 426/513
  See application file for complete search history.

(56) References Cited

U.S. PATENT DOCUMENTS

| | | | |
|---|---|---|---|
| 3,909,881 A | | 10/1975 | Anderson |
| 4,106,162 A | * | 8/1978 | Fournier ............... 425/298 |
| 4,139,589 A | * | 2/1979 | Beringer et al. ............. 264/250 |
| 5,176,922 A | * | 1/1993 | Balsano et al. ............... 425/89 |
| 6,386,854 B1 | | 5/2002 | Guss |

* cited by examiner

*Primary Examiner* — Maria Veronica Ewald
(74) *Attorney, Agent, or Firm* — Malin Haley DiMaggio Bowen & Lhota, P.A.

(57) ABSTRACT

A system for preparing compressible food stuff such as ground meat to include a central cavity in the meat product which can receive one or more condiments prior to cooking with the pressing and shaping devices to cover the condiment filled cavity with an additional layer of the compressible food product for a final shape and compressed product. The molding system includes a mold body that is cylindrically shaped, a first press plate that includes a central smaller in diameter protrusion for forming a cavity in a compressible food product, a second press plate having a flat disc shaped for compressing the top layer of meat over the cavity and an adapter ring used to raise the side wall of the mold body for adding a second layer of meat to be compressed with the second press plate.

4 Claims, 2 Drawing Sheets

APPARATUS FOR FORMING CONDIMENT RECEIVING CAVITY IN GROUND MEAT

BACKGROUND OF THE INVENTION

1. Field of the Invention

This invention relates generally to a method and apparatus for shaping ground meat products such as hamburger patties and specifically to a method and apparatus that can provide forming a central cavity in a ground meat product such as a hamburger for receiving condiments prior to cooking and covering the condiment filled cavity with an additional layer of the meat product.

2. Description of Related Art

The use of presses and shaping devices with ground meat for forming patties is well known in the prior art. One of the purposes is to achieve uniformity in the end product in size and shape and content. Another purpose is that a more substantially formed ground meat product can be obtained using a press or shaping device than shaping manually.

It is often desirable when cooking and serving ground meat products to include other foodstuffs and condiments that are served with the ground meat patty.

A device for forming a compressible food item is shown in U.S. Pat. No. 6,386,854 issued May 14, 2002. This device is primarily for making ravioli. An apparatus for making a hollow hamburger is shown in U.S. Pat. No. 3,909,881 issued Oct. 7, 1975. A tinfoil type pocket is inserted into a hamburger patty from the side. Condiments are added after the hamburger is cooked.

The present invention provides a noncomplex, inexpensive apparatus for compressible foods such as hamburgers which includes a shaping device for creating an accessible cavity in the center of the hamburger patty for receiving condiments that will be cooked with the patty and then the filled condiment cavity is covered over and pressed by additional hamburger meat for cooking.

SUMMARY OF THE INVENTION

A system for shaping a compressible food product such as ground meat while also forming a central cavity in the ground meat patty comprising a mold body having a cylindrical primary wall and integrally formed base closure on one side of said mold body. A recessed lip is disposed around the inside periphery of said cylindrical mold body wall. Another necessary item for forming the meat product that is used with the mold body is a first circular press plate that has a raised central area on one side, the circular plate sized in diameter to fit inside the recessed lip of said mold body. A handle is attached to one side of said first circular plate. The first circular press plate is used to compress a food product placed in the mold body and to form a cavity.

Also used with the system is a mold adapter ring which includes an extended peripheral lip and a peripheral exterior wall. The adapter ring is sized in diameter and shaped circularly to fit snugly in the mold body for extending the side wall upwardly in elevation of the inside wall of the mold body when the adapter ring is inserted in the mold body. Also used with the system is a second circular press plate of a predetermined thickness and a diameter that fits inside the adapter ring. A handle is attached to one side of said second press plate. An additional ground meat layer can be placed over the originally formed ground meat patty that is in the mold body and that received a cavity in the meat patty and a condiment for the finished product. The added meat layer is pressed flat by manually activating the second circular press plate with the adapter ring.

In order to make a hamburger patty that includes a central cavity that can be filled with a condiment, the invention is used in accordance with the following steps.

The first step is to place, inside the mold body, a compressible food product such as ground meat, i.e. ground hamburger or ground round. Once the mold body has been partially filled with ground meat, the first circular press plate is then manually placed on the top of the mold body against the ground meat so that the first press plate's exterior periphery fits into the recessed lip at the top of the mold body across the open top stopping the press plates downward movement. The first press plate has a raised central cylindrical projection on one side that compresses the ground meat forming a central cylindrical cavity in the meat product. The first press plate is then removed from the mold body. The compressed meat patty having the central cylindrical cavity is then filled with one or more condiments.

The next step is to insert the adapter ring into the mold body containing the ground meat. The adapter ring raises the available height for molding a meat product above the mold body and helps release the patty from the mold. Once the adapter ring is firmly mounted inside the mold body, the condiment or condiments are added manually into the meat product cavity formed in the hamburger patty. Once the condiments have been added to the meat cavity, an additional layer of meat product is then placed over the meat patty entirely covering the patty and the cavity containing the condiment. A second press plate is used in conjunction with the adapter ring to compress the added top layer of the meat product that covers the condiment, shaping and forming a perfect cylindrical patty in which a condiment is disposed within a cavity in the center of the meat patty. The meat patty is then ready for cooking.

It is an object of this invention to provide an improved molding device and process for forming a compressible food product such as a hamburger patty with a central interior cavity for receiving a condiment.

It is another object of this invention to provide a noncomplex mold for a compressible food product that can form a central cavity in a compressible food product efficiently and simply.

In accordance with these and other objects which will become apparent hereinafter, the instant invention will now be described with particular reference to the accompanying drawings.

DETAILED DESCRIPTION

Figure 1:
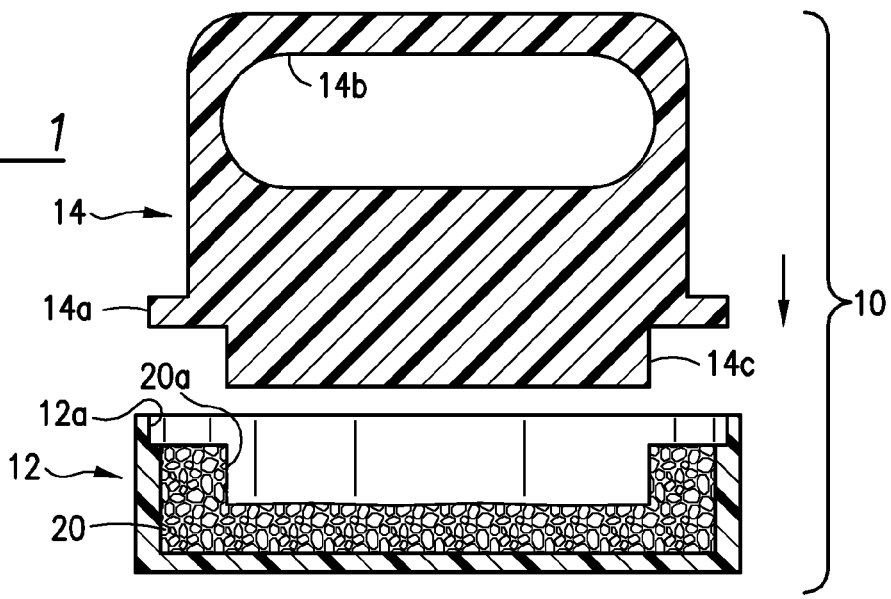
FIG. 1 shows an exploded front elevational view in cross-section of the first press plate and the mold body containing a compressed food product after the meat product cavity has been formed.

Referring now to the drawings and in particular FIG. 1, the invention 10 includes first press plate 14 shown in an exploded view above the mold body 12 that is used to mold a meat product 20 which is provided inside of mold body 12. The mold body 12 is basically a cylindrical shape having an open top that includes a inside peripheral lip 12a disposed entirely around the top opening of mold body 12. As shown in FIG. 1, the meat product 20 has already been subjected to first press plate 14 which includes a cylindrical plate body 14a and a cylindrical protrusion 14c. that when pressed against the compressible meat product 20 forms a cavity 20a in the meat product 20. The first press plate 14 also includes opening 14b that is used as a handle to manually grasp plate first press plate 14. Thus the first press plate 14 in combination with the mold body 12 comprise a press and mold that when taken together can form a meat product 20 that is shaped like a hamburger but includes a cavity 20a to receive a condiment.

Figure 2:
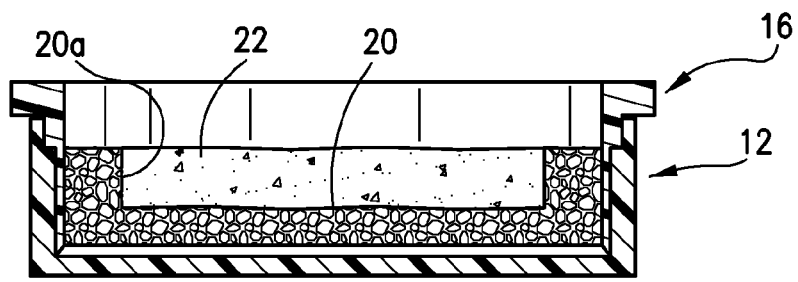
FIG. 2 shows a front elevational view in cross-section of the first mold body and the adapter ring mounted inside the mold body.

Referring now to FIG. 2 an additional element such as adapter ring 16 has been manually inserted into mold body 12 containing the compressed food product 20. Also as shown in FIG. 2, a condiment 22 has been added into cavity 20a filling up the cavity 20a. The adapter ring 16 is necessary to raise the mold 12 wall sufficiently to put an additional meat product on top of the product 20 and condiment 22.

Figure 3:
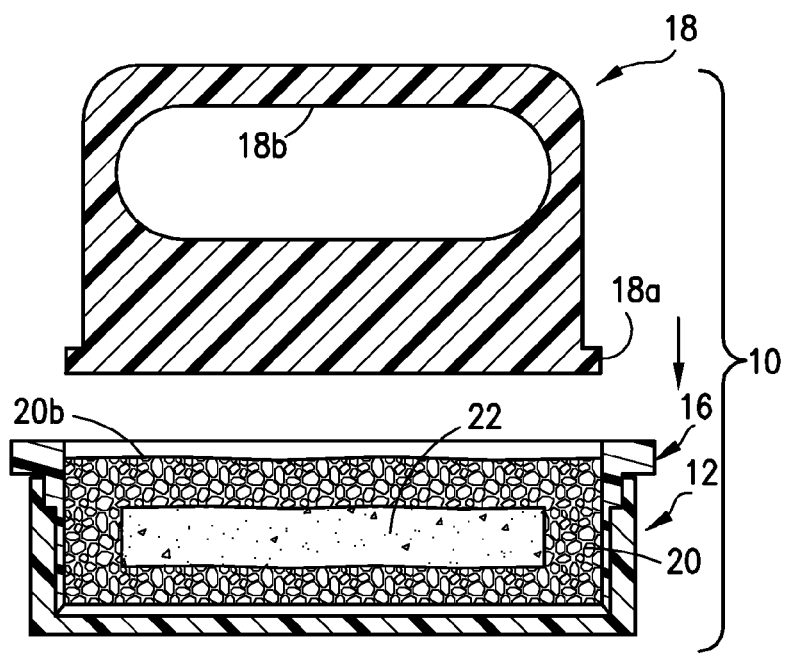
FIG. 3 shows an exploded front elevational view in cross-section that includes the mold body, the adapter ring fitted into the mold body containing a molded food product that has a meat product cavity formed therein, and a second press plate used to press the top layer of meat added above the condiment cavity.
Figure 4:
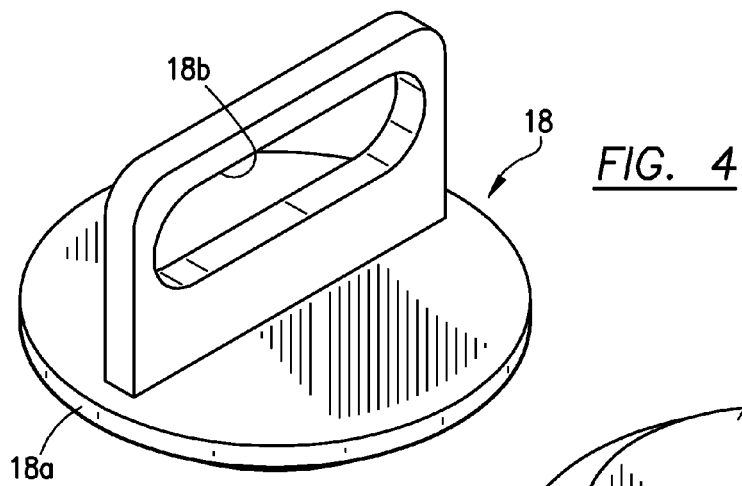
FIG. 4 shows a top perspective view of the second press plate shown in FIG. 3.

Referring now to FIG. 3 a second press plate 18 is shown that has a single flat cylindrical disk around its base 18a and a handle formed by opening 18b. As shown in FIG. 3, an additional meat product 20b a has been added to mold body 12 that includes the adapter ring 16. The additional meat product 20b has been compressed with second press plate 18 leaving a flat top layer 20b as shown in FIG. 3. The meat product 20 and condiment 22 as shown in FIG. 3 include a top layer 20b of the added meat product completely enclosing condiment 22 with a meat product. The patty can be removed from the adapter ring and mold in FIG. 3 and placed in a pan or grill for cooking. The second press plate 18 shown in FIG. 3 is also shown in FIG. 4. The press plate 18 shown in FIG. 4 includes a rigid disc 18a and a handle (that includes opening 18b) and is used to manually press down on the meat while grasping the handle 18b.

Figure 5:
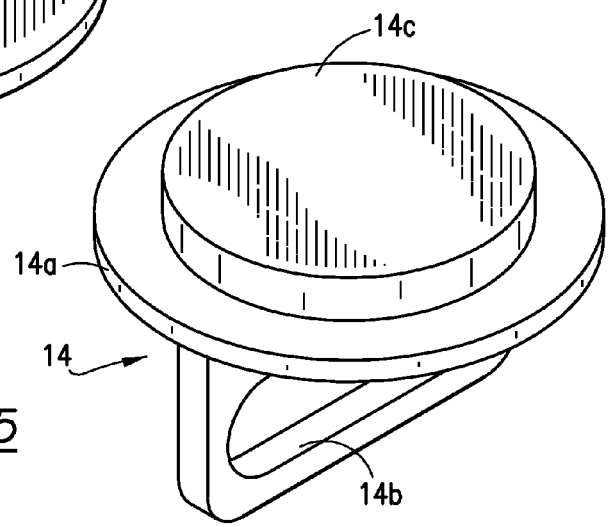
FIG. 5 shows a bottom perspective view of the first plate press shown in FIG. 1.

Referring now to FIG. 5, the first press plate 14 that is used to create a cavity 20a in the compressed meat is shown upside down. The first press plate 14 includes a rigid disk body 14a which has a center cylindrical projection 14c and is integrally attached to the disk portion 14a and the handle with opening 14b so that the first press plate shown in FIG. 5 can create a cavity in a compressible food product such as hamburger as is clearly shown in FIG. 1.

Figure 6:
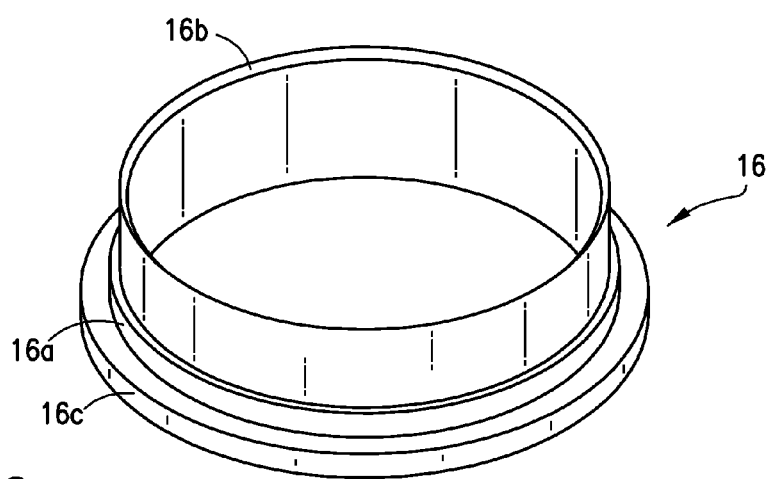
FIG. 6 shows a bottom perspective view of the adapter ring.

FIG. 6 shows the adapter ring 16 which includes annular lip 16c and a second smaller lip 16a and a cylindrical wall 16b which are all integrally formed together to form the adapter ring 16. The purpose of the adapter ring 16 as shown is in FIGS. 2 and 3. The adapter ring 16 allows a second layer of meat to be added after the condiment 22 has been added and allows the meat be compressed as a second top layer by in effect extending the mold wall upwardly after the cavity 20a as shown in FIG. 1 has been formed from the first cavity press plate 14.

The mold body 12, the first press plate 14, the second press plate 18, and the adapter ring 16 can be made of any suitable rigid material including metal, stainless steel, or plastic provided the material is substantially usable when dealing with compressible food products from a hygiene standpoint.

Referring back to FIG. 1 and FIG. 5, the projection 14c which forms the condiment cavity 20a in the compressible meat product could obviously be made in different shapes and does not have to be cylindrical depending on the size and shape of the meat cavity that is desired in the ultimate meat product to be cooked. A series of different cavity press plates similar to plate 14 could be made having different shaped projections, for forming different shaped and sized cavities in the meat product. The mold body itself could be made in different shapes and does not have to be cylindrical which would also require a different shape adapter ring if the mold body shape is changed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for compressing and molding a compressible food product to include a cavity in the compressible food product for receiving a condiment comprising:

mold body having a base and a raised wall attached to and surrounding said base forming a mold;

first compressible food press plate having a flat disc shaped body, said body including a smaller in diameter protrusion along one side of said body and a handle attached to the other side of said first press plate body, said press plate body disc and protrusion when pressed against a compressible food product forming a cavity in said compressed food product;

second press plate for compressing a compressible food product including a disc shaped body having a predetermined diameter sized to fit within said mold body and having a flat surface on one side, and a handle attached to the opposite side of said disc shaped body; and adapter ring having a circular wall, the outside diameter being sized to fit snugly along the inside diameter of said mold body and said adapter ring including a peripheral lip, the diameter which exceeds said mold body sized to receive said second press plate.

2. A system as in claim 1 including:

meat product that is compressible, said meat product being hamburger and said condiment being onions, the finished meat product being essentially a cylindrical hamburger having an internal cavity that includes onions.

3. A system for compressing and molding a compressible food product including a cavity in a compressible food product for receiving a condiment and for covering the condiment with additional compressible food products comprising:

mold body for receiving a compressible food product and for shaping and molding said compressible food product said mold body including a raised wall and a base;

a first compressible food press sized to fit in and for compressing said compressible food product contained in said mold body said first compressible food press including a means for forming a cavity in said compressed food product when said compressed food product is pressed by said first compressible food press;

second manual press for compressing a compressible food product that includes a flat pressing surface having a predetermined diameter to fit within said mold body said second press including a handle attached to one side of said second press; and adapter ring sized to fit snuggly inside said mold body and raise the outside wall of said mold body and also sized to receive said second press for compressing additional compressible food product after said cavity has been formed and a condiment added to said second food product to give the final result in product appearance of the conventional food product.

4. A system as in claim 3 comprising:

said mold body being cylindrical in shape to create a final compressible food product that is substantially cylindrical in shape and said first press for providing a cavity in said compressible food product compressed against said compressible food product being cylindrical in shape.

\* \* \* \* \*